United States Patent [19]

Camey et al.

[11] 4,423,885
[45] Jan. 3, 1984

[54] REMOVABLE GOOSENECK TRAILER

[75] Inventors: William R. Camey; Larry E. Hasenberg, both of Kewanee, Ill.

[73] Assignee: Hyster Company, Portland, Oreg.

[21] Appl. No.: 301,201

[22] Filed: Sep. 11, 1981

[51] Int. Cl.³ .............................................. B62D 53/06
[52] U.S. Cl. ............................ 280/423 B; 280/425 A; 414/481
[58] Field of Search ....................... 280/423 B, 425 A; 414/481

[56] References Cited

U.S. PATENT DOCUMENTS

| | | | |
|---|---|---|---|
| 2,545,584 | 3/1951 | Meadows | 280/425 A |
| 2,944,834 | 7/1960 | Hill | 280/425 A |
| 2,953,396 | 9/1960 | Meadows | 280/423 |
| 2,967,720 | 1/1961 | Smith et al. | 280/425 A |
| 3,043,609 | 7/1962 | Talbert | 280/423 B |
| 3,215,449 | 11/1965 | Talbert | 280/425 A |
| 3,517,945 | 6/1970 | Fikse | 280/425 A |
| 3,536,340 | 10/1970 | Talbert | 280/425 A |
| 3,632,139 | 1/1972 | Stafford, Jr. | 280/425 A |
| 3,866,947 | 2/1975 | Yakubow | 280/425 |

FOREIGN PATENT DOCUMENTS 1355285 6/1974 United Kingdom ............ 280/423 B

Primary Examiner—Joseph F. Peters, Jr.
Assistant Examiner—Kenneth R. Rice
Attorney, Agent, or Firm—Tim A. Long

[57] ABSTRACT

A trailer assembly is provided with means to lower the trailer platform to the ground where the gooseneck may be detached from the platform to facilitate loading. A rotatable detachable connection of the gooseneck to the platform is provided by interlocking hooks on the gooseneck frame and the platform. Raising and lowering of the platform is accomplished by hydraulic rams located in the gooseneck which, through a force amplifying linkage apply force to an arm, pivotally connected to the gooseneck, and bearing on the platform at a location remotely to the rear of the forward connection. A force couple is created about the interlocking hooks resulting in relative rotation of the platform and gooseneck and raising or lowering of the platform. The position of the gooseneck and platform is maintained for travelling by compression blocks which bear against the gooseneck frame and the arm isolating the raising and lowering mechanism from loads. A rod, which engages the platform frame and the arm restrains the gooseneck in the event of platform load reversal.

13 Claims, 8 Drawing Figures

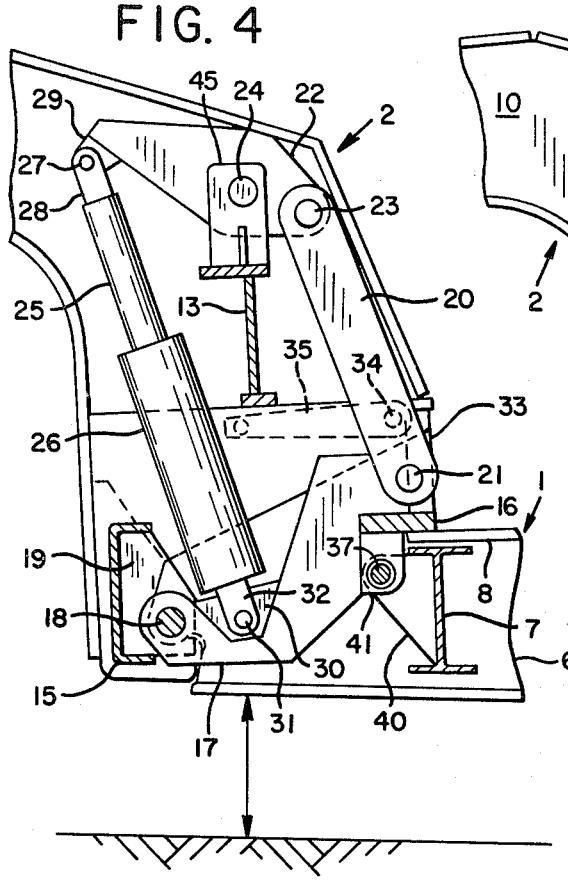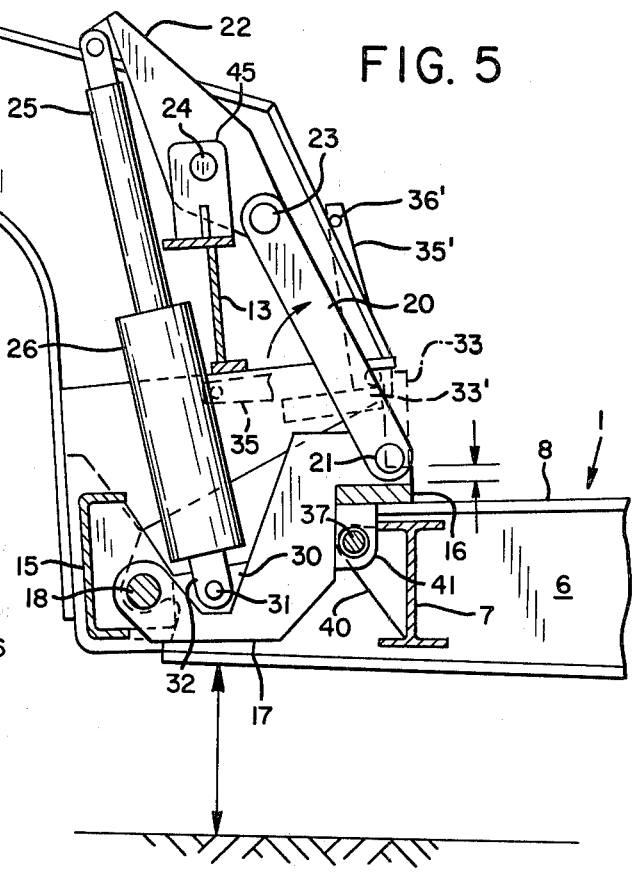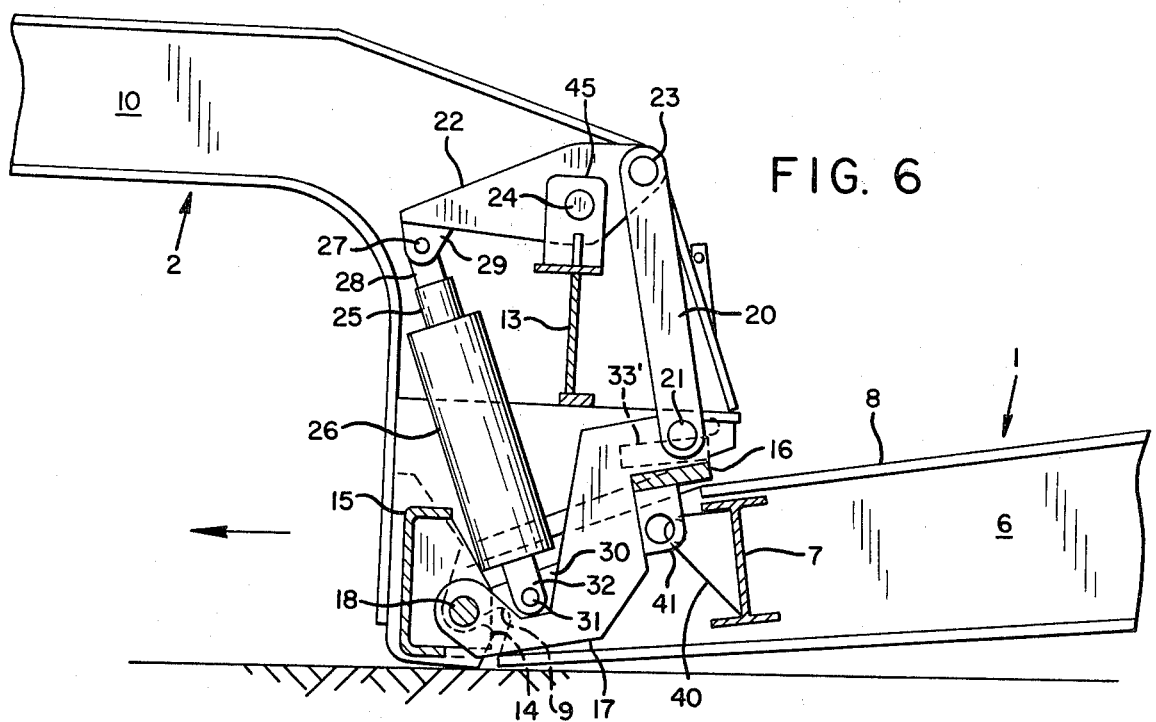

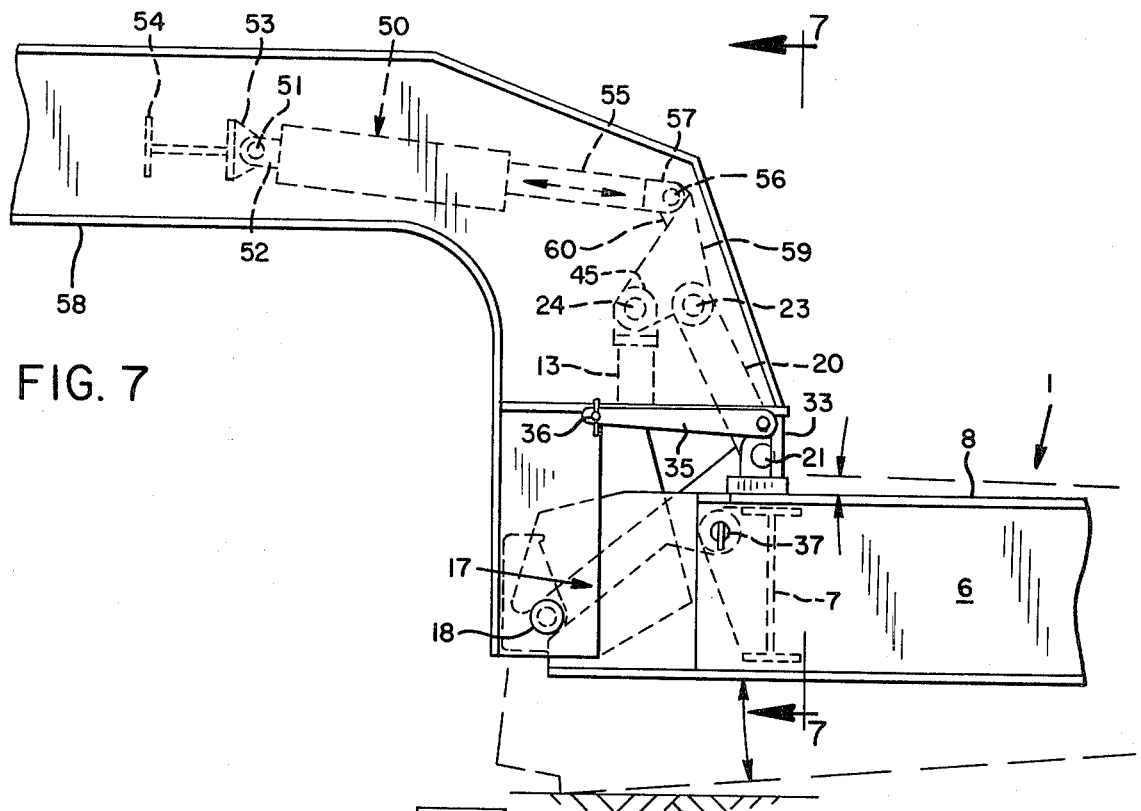
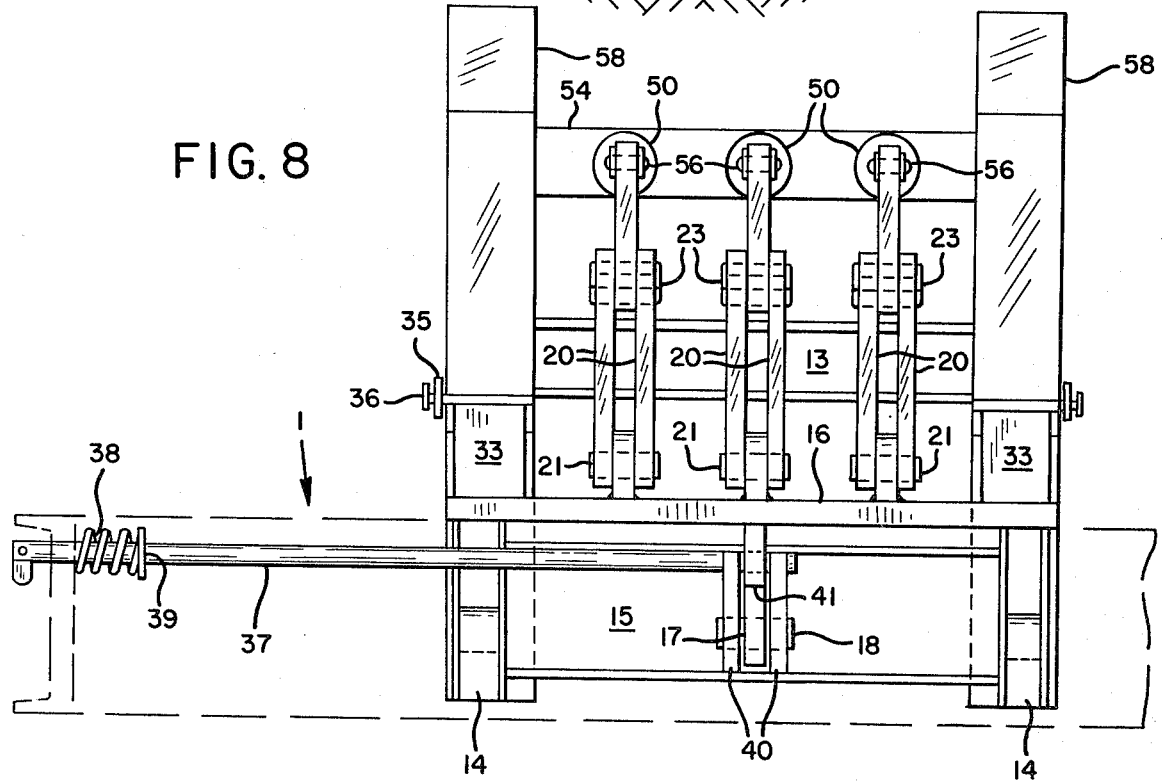

REMOVABLE GOOSENECK TRAILER

BACKGROUND OF THE INVENTION

1. Field of the Invention

The present invention relates to heavy duty industrial trailers, and more particularly to trailers which have removable goosenecks to facilitate loading and unloading.

2. Description of the Prior Art

In removable gooseneck trailers of the non-ground engaging type, raising and lowering of the platform is accomplished by the application of force; directly or indirectly, through a hinged joint; to the trailer platform. This force is reacted against that part of the gooseneck attached to the tractor causing relative rotation of the platform and the gooseneck. When the front of the platform has been lowered to the ground, the gooseneck can be detached from the platform to facilitate loading of the platform.

U.S. Pat. Nos. 2,967,720 to Smith; 3,215,449 to Talbert; and 3,563,340 to Talbert; typify trailers with a segmented gooseneck. The initial cost and maintenance of the gooseneck joint, which must bear the weight of the load and platform, and drawbar loads, are disadvantages of these designs. Several designs, exemplified by U.S. Pat. Nos. 2,545,584 to Meadows, 2,944,834 to Hill; 2,953,396 to Meadows; 3,043,609 to Talbert; and 3,632,139 to Stafford; utilize a rigid gooseneck with a hinged connection to the platform, as opposed to the segmented gooseneck, but incorporate the above disadvantages, in that all or part of the weight and drawbar loads are borne by the movable joints in the lifting mechanism during travel.

U.S. Pat. Nos. 3,517,945, to Fiske and 3,866,947, to Yakubow show mechanisms which have overcome this disadvantage by the use of interlocking hook mechanisms at the front of the gooseneck to react against drawbar loads and, in conjunction with a compression block bearing against the rear of the gooseneck frame, the weight of the load and platform. However, these designs require relatively large diameter hydraulic rams, to provide the force necessary to lift the heavily loaded platform. These rams are mounted in an upright position at the rear of the gooseneck potentially interferring with loads which overhang the gooseneck and exposed to damage during the positioning of the load on the platform. Further, the positioning of the depending hydraulic ram at the rear of the gooseneck to engage a socket or clevis connection in the platform is difficult and often final positioning of the cylinder must be accomplished manually.

3. Summary of the Invention

In the removable gooseneck trailer of the present invention, the trailer platform is connected to the front of the gooseneck by a rotatable detachable coupling in the form of interlocking hooks. Relative rotation of the gooseneck and platform, for platform raising and lowering is accomplished by the application of force to the platform rearwardly of the forward coupling. The force is applied through an arm which is rotatably connected to the gooseneck frame to simplify positioning. The thrust force is generated by hydraulic rams remotely located from the point of application of force to the platform and acts on the arm through a force-amplifying linkage.

When travelling, compression blocks between the arm and the gooseneck frame prevent relative rotation of the platform and gooseneck, and isolate the raising and lowering mechanism from loads. A rod engaging the platform and the arm locks the gooseneck when disconnected from the tractor or during momentary platform load reversal.

BRIEF DESCRIPTION OF THE DRAWINGS

The accompanying drawings illustrate the embodiment of the principles of the invention described herein, in which:

FIG. 4 is a sectional view of the gooseneck and platform generally along line 4—4 showing the raising and lowering mechanism with the platform in the preferred travel position;

FIG. 5 is a sectional view of the gooseneck and platform generally along line 4—4 showing the platform as raised in preparation for lowering;

FIG. 6 is a sectional view of the gooseneck and platform generally along line 4—4 showing the platform as lowered to the ground and the gooseneck disengaged;

FIG. 7 is a side elevation of the gooseneck and forward end of the platform illustrating an alternative embodiment, and;

FIG. 8 is a rear view of the gooseneck illustrating an alternative embodiment.

DESCRIPTION OF THE PREFERRED EMBODIMENT

Figure 1:
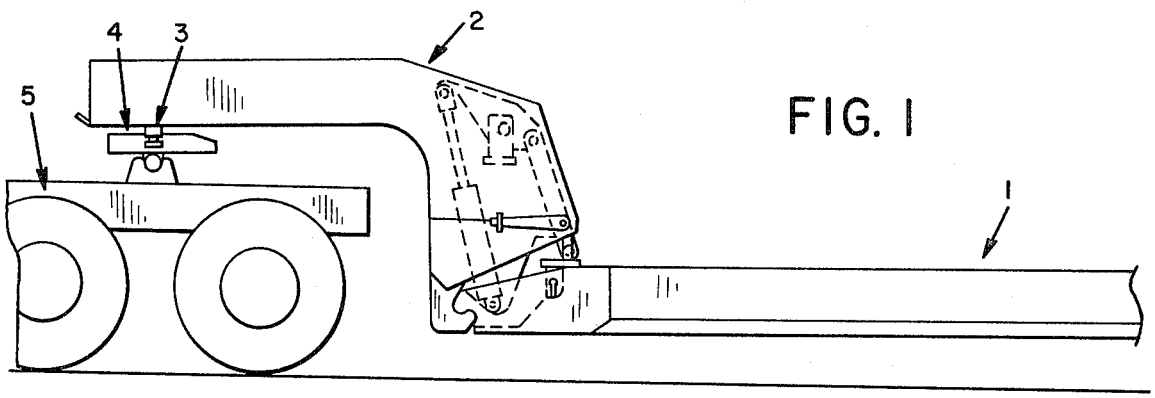
FIG. 1 is a side elevation view of a tractor and trailer with the removable gooseneck assembly in which the trailer platform is shown in the preferred traveling position.

The trailer is a low bed, heavy duty trailer of the type used to transport heavy equipment. As illustrated in FIG. 1 the trailer comprises a platform 1 supported at the rear by a plurality of wheels, not shown for convenience, and a gooseneck 2 attached to the front of the platform. The gooseneck, in turn, is attached to a tractor 5 by a king pin 3 which engages a conventional tractor-mounted fifth wheel 4. By means which is described hereinafter, the gooseneck is adapted to allow the platform to be lowered to the ground where the gooseneck may be detached from the platform. Loads to be carried by the trailer may then be driven, or otherwise moved, over the front of the platform for loading or unloading. The gooseneck is then reattached to the platform and the platform is raised for travel.

Figure 2:
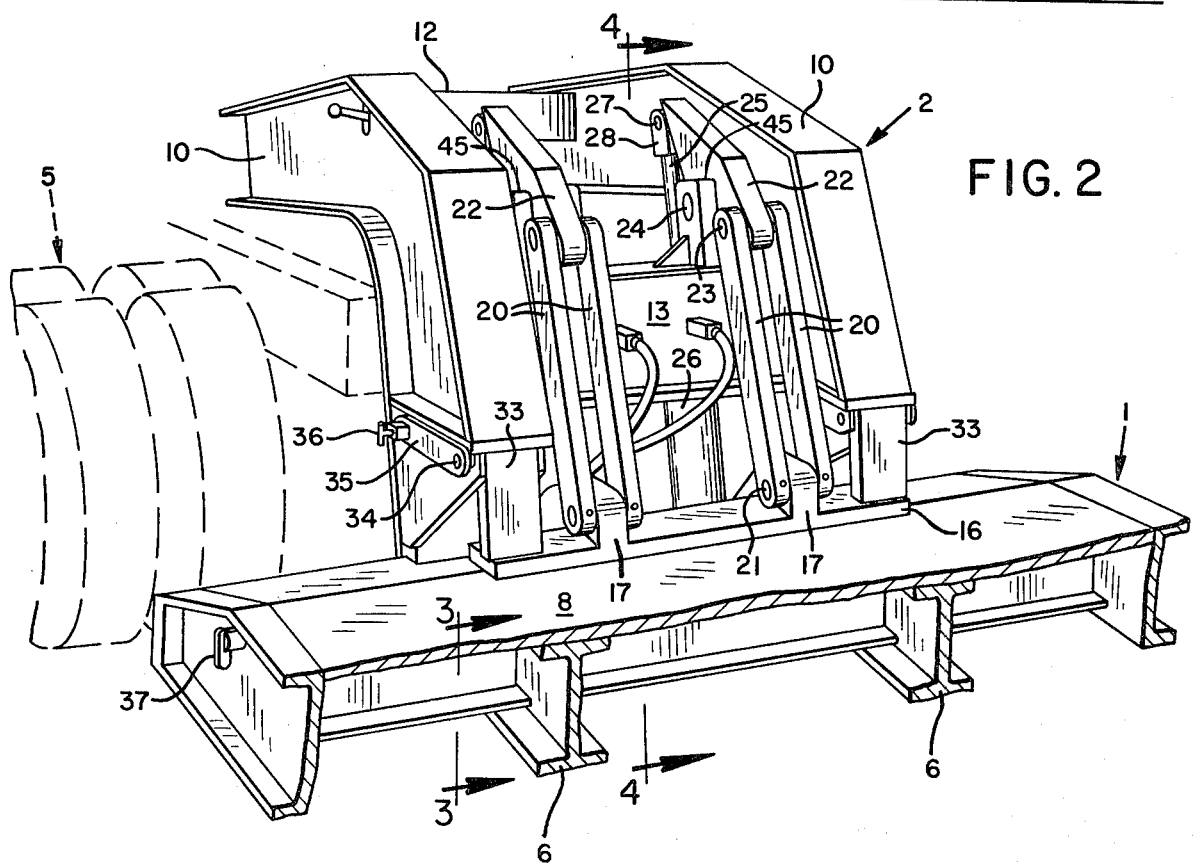
FIG. 2 is a perspective view of the rear of the gooseneck illustrating the raising and lowering mechanism with the trailer platform in the traveling position.
Figure 3:
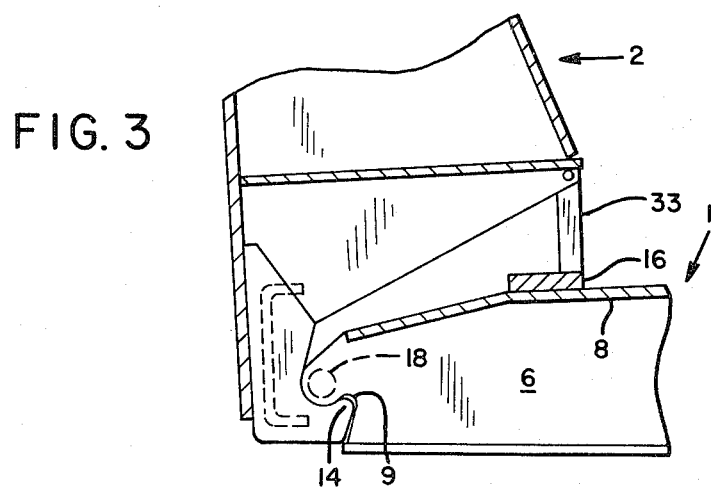
FIG. 3 is a sectional view of the trailer platform generally along line 3—3 illustrating the engaged hooks of the platform and gooseneck.

Referring to FIG. 2 and FIG. 3, the platform comprises two laterally spaced apart main beams 6 of I-shaped cross section. A number of lateral cross beams; including beam 7, see FIG. 4, connect the main beams and extend from the main beams to the periphery of the platform. The surface of the platform is covered by suitable decking 8. Downwardly facing platform hooks 9 are affixed to the forward ends of the main beams 6.

The gooseneck frame is comprised of gooseneck main beams 10 of generally I-shaped cross section which are laterally spaced apart by cross beams 12 and 13. Upwardly facing gooseneck hooks 14 are rigidly affixed to the lower front corner of the gooseneck main beams 10 and spaced to engage the downwardly facing platform hooks 9. A cross beam 15 is interposed between the gooseneck hooks 14. As can be seen, the weight of the platform and load, if any, maintain the engagement of the gooseneck and platform hooks and the draft force exerted by the tractor is transmitted to the platform through the engaged hooks. However, the hooks permit relative rotation of the platform and gooseneck and when the platform is supported, as when sitting on the ground, the gooseneck hooks may be disengaged from the platform hooks to allow the gooseneck to be detached from the platform.

Relative rotation of the gooseneck and platform, for raising and lowering, is accomplished and controlled by a linkage mechanism in the gooseneck which permits the exertion of force to the platform at the rear of the gooseneck generating a force couple about the interconnected hooks. Force is applied to the platform through a bearing plate 16 which is affixed to lower arms 17 which are pivotally connected, by pin 18 engaging a pair of plates 19 affixed to cross beam 15, to the gooseneck frame. The pin 18 is located coincident to the centerline of rotation of the hooks 9 and 14 to reduce sliding of the bearing plate 16 and resultant wear of the platform deck as the gooseneck and the platform rotate.

Force to rotate the lower arm 17 and, consequently, the gooseneck and platform; is transmitted to the arm by a plurality of links 20 pivotally connected at one end to the lower arm 17 by pin 21. The other end of the links are pivotally connected to a force-amplifying lever 22 by pin 23. The lever 22 is pivotally connected to the gooseneck frame by fulcrum pin 24 which engages a pair of plates 45 affixed to cross beam 13.

Force for raising and lowering is generated by a plurality of extensible hydraulic rams 26 located forward in the vertical section of the gooseneck so as to be protected from damage by loads on the platform and reduce the height of the gooseneck frame where the horizontal and vertical sections join. The extensible rod 25 of ram 26 is pivotally attached to lever 22 by pin 27 which engages a yoke 28 attached to rod 25 and a lug 29 affixed to the lever 22. The shell of the ram 26 is pivotally attached by means of a pin 31 which engages a lug 30 on the lower arm 17 and a yoke 32 affixed to the ram shell resulting in improved efficiency of the transmission of force from ram 26 to lower arm 17 and consequently permitting the use of smaller diameter and less expensive ram.

In larger capacity trailers, requiring higher forces to raise and lower the platform and having gooseneck main beams 58 of deeper section, an alternative embodiment, see FIG. 7 and FIG. 8, may be used. In this embodiment a plurality of rams 50 are located in the horizontal section of the gooseneck and pivotally attached to a gooseneck cross beam 54 by pin 51 which engages lug 53 affixed to the cross beam and a yoke 52 attached to the ram shell 50. The extensible rod 55 is pivotally connected to a force amplifying lever 59, which transmits force through link 20 to arm 17, by pin 56 which engages a lug 60 affixed to the lever and a yoke to attached to rod 55.

The weight of the platform and load, if any, maintains the engagement of the hooks 9 and 14 and creates a force couple which urges the rear of the gooseneck and the platform to rotate together. Compression blocks 33 which bear against the gooseneck main beam 10 and the bearing plate 16 are provided to lock the gooseneck and platform for travel. The compression load exerted on the compression blocks is transmitted directly to the gooseneck main beam and platform and the lowering and raising mechanism is isolated from loads during travel. Compression blocks 33 are rotatably attached to the gooseneck main beam 10 by shaft 34 passing through a hole in the gooseneck main beam and affixed at one end to the compression block 33 and at the other to a handle 35. A spring loaded pin lock 36 maintains the handle's position.

A means is provided to lock the gooseneck against rotation when the trailer is disconnected from the tractor or in the event of a momentary reversal of platform load due to shock loads as a result of operation of an unloaded trailer on rough surfaces. A rod 37 urged into position by spring 38 bearing against the platform frame and collar 39, affixed to the rod, engages a hole, in plates 40 affixed to the platform cross beam 7 on each side of the lower arm 17, which is coincident with a hole in a lug 41 affixed to the lower arm. As can be seen, the rod 37 blocks the gooseneck against rotation away from the platform should the supporting force of the tractor be removed from the gooseneck or an upward force be applied to the platform.

OPERATION

FIG. 4 shows the platform and gooseneck in the travel position with the compression blocks 33 engaged to block the gooseneck and platform against rotation. To lower the platform, the ram 26 is first extended, as illustrated in FIG. 5. The lever 22 is caused to rotate clockwise and through links 20 exerts force downward on the platform at the bearing plate 16. The application of force at the bearing plate creates a force couple about the engaged hooks 9 and 14 which causes the gooseneck and the platform to rotate away from each other raising the front of the platform. The compressive load on the compression block 33 is relieved allowing the compression block 33' to be rotated forward and up by rotating the handle 35' to the position shown in FIG. 5.

The handle is locked into position by the engagement of the lock pin 36' with the gooseneck main beam 10. The platform may now be lowered to the ground by the retraction of the hydraulic ram 26. The lock rod 37 is withdrawn from engagement with the lower arm 17. Further retraction of the ram with the platform supported by the ground surface allows the disengagement of hooks 9 and 14, as illustrated in FIG. 6. Blocks, not shown, are placed between the gooseneck main beam and the tractor frame to support the gooseneck. The tractor may then be driven forward to clear the front of the platform for loading.

After loading of the platform, the tractor and gooseneck are repositioned to re-engage the gooseneck hooks 14 and the platform hooks 9. The bearing plate 16, being attached to the gooseneck through the lower arm 17, is guided into place by the positioning of the gooseneck to engage the hooks. The lock rod 37 is then re-engaged in the hole in the lower arm and the ram 26 is extended to raise the platform to position shown in FIG. 5. The compression blocks 33' may then be rotated down to the engaged position 33. The ram is then retracted to return the platform to the travel position as shown in FIG. 4.

While a preferred embodiment of the invention has been shown, it will be apparent to those skilled in the art that many changes and modifications may be made without departing from the invention in its broader aspects. It is, therefore, intended that the appended claims cover all such changes and modifications as fall within the true spirit and scope of the invention.

We claim:

1. In a trailer, including a platform and gooseneck, an apparatus connecting the platform to the gooseneck comprising:
   (a) a rotatable, detachable forward coupling means connecting one end of the platform to a forward location on the gooseneck;
   (b) an arm having a first end rotatably attached to the gooseneck and a second end bearing on the platform at a location remotely to the rear of the forward coupling means, such that rotation of the arm will create a force couple about the forward coupling means resulting in the relative rotation of the gooseneck and platform;
   (c) a link having a first end pivotally attached to the arm;
   (d) a lever rotatably attached to the gooseneck at a first location and pivotally attached at a second location to the second end of the link, and;
   (e) means to rotate the lever attached to the lever at a third location remote from said second location.

2. The apparatus according to claim 1 wherein, the means to rotate the lever comprises a ram means having a first end pivotally connected to the arm and having a second end pivotally connected to the lever.

3. The apparatus according to claim 1 wherein the means to rotate the lever is attached to the lever at said third location; said third location being more remote from said first location than said second location, thereby amplifying at the link the force generated by the means of rotation.

4. The apparatus according to claim 3 wherein the means to rotate the lever comprises a ram means having a first end pivotally connected to the gooseneck and having a second end pivotally connected to the lever.

5. The apparatus according to claim 3 wherein, the means to rotate the lever comprises a ram means having a first end pivotally connected to the arm and having a second end pivotally connected to the lever.

6. The apparatus according to claim 1 wherein, the first end of the arm is rotatably attached to the gooseneck at a location coincident with the axis of rotation of the forward coupling means.

7. The apparatus according to claim 1 further comprising means for selectively locking the gooseneck against rotation relative to the platform.

8. The apparatus according to claim 7 wherein the means to lock the gooseneck against rotation relative to the platform comprises a block selectively interposed between the platform and the gooseneck at a location to the rear of the forward coupling means so as to be loaded in compression.

9. The apparatus according to claim 7 wherein the means to lock the gooseneck against rotation relative to the platform comprises a block selectively interposed between the gooseneck and the arm at a location to the rear of the forward coupling means so as to be loaded in compression.

10. The apparatus according to claim 9 wherein the means to lock the gooseneck against rotation relative to the platform further comprises a shaft slidably connected to the platform and engaging the arm at a hole provided therein.

11. In a trailer, including a trailer platform supported at one end by a load wheel and a gooseneck, an apparatus for selectively connecting the platform to the gooseneck and raising and lowering the platform comprising:
   (a) a downward facing hook affixed to the trailer platform at the end of the trailer platform opposite of the load wheel;
   (b) an upward facing hook affixed to the gooseneck at a forward location on the gooseneck and aligned to engage the downward facing hook affixed to the platform so as to form a rotatable, detachable forward coupling;
   (c) an arm having a first end rotatably attached to the gooseneck at a location coincident with the centerline of rotation of the forward coupling and a second end bearing on the platform at a location remotely to the rear of the forward coupling, such that, rotation of the arm will create a force couple about the forward coupling resulting in the relative rotation of the gooseneck and platform;
   (c) a link having a first end pivotally attached to the arm;
   (d) a lever rotatably attached at a fulcrum to the gooseneck and pivotally attached at a location remote from the fulcrum to the second end of the the link;
   (e) a ram means pivotally attached to the lever at a location more remote from the fulcrum than the point of attachment of the lever to the link, such that, the lever will multiply the force of the ram means at the link;
   (f) a block means rotatably attached to the gooseneck so as to be rotatable to a first position interposed between the arm and the gooseneck at a point remotely rearward of the forward coupling, so as to be loaded in compression and prevent the arm from rotating relative to the gooseneck, and rotatable to a second position of non-engagement with the gooseneck and arm so as to permit rotation of the arm when raising or lowering the platform; and,
   (g) a shaft slidably connected to the platform so as to selectively engage the arm at a hole pivoted therein.

12. The apparatus according to claim 11 wherein, the ram means has a first end pivotally connected to the lever and a second end pivotally connected to the gooseneck.

13. The apparatus according to claim 11 wherein, the ram means has a first end pivotally connected to the lever and a second end pivotally connected to the arm.

* * * * *